United States Patent
Wu et al.

(10) Patent No.: US 8,570,679 B2
(45) Date of Patent: Oct. 29, 2013

(54) READ CHANNEL AVERAGING

(75) Inventors: Yunxiang Wu, San Jose, CA (US); Henry Bang, Saratoga, CA (US); Richard Wang, Fremont, CA (US)

(73) Assignee: Seagate Technology International, Grand Cayman (KY)

( * ) Notice: Subject to any disclaimer, the term of this patent is extended or adjusted under 35 U.S.C. 154(b) by 543 days.

(21) Appl. No.: 11/709,719

(22) Filed: Feb. 21, 2007

(65) Prior Publication Data

US 2008/0198490 A1    Aug. 21, 2008

(51) Int. Cl.
 *G11B 5/09* (2006.01)
(52) U.S. Cl.
 USPC ............ 360/46; 360/25; 360/31; 360/39; 360/55; 360/65
(58) Field of Classification Search
 None
 See application file for complete search history.

(56) References Cited

U.S. PATENT DOCUMENTS

| | | | |
|---|---|---|---|
| 5,422,760 A * | 6/1995 | Abbott et al. | 360/46 |
| 5,886,842 A * | 3/1999 | Ziperovich | 360/51 |
| 6,172,828 B1 * | 1/2001 | Tsunoda et al. | 360/46 |
| 6,216,148 B1 * | 4/2001 | Moran et al. | 708/819 |
| 6,476,992 B1 * | 11/2002 | Shimatani | 360/46 |
| 6,519,715 B1 * | 2/2003 | Takashi et al. | 714/32 |
| 6,532,122 B1 * | 3/2003 | Sugawara et al. | 360/46 |
| 6,674,592 B2 * | 1/2004 | Shimoda | 360/51 |
| 6,788,484 B2 * | 9/2004 | Honma | 360/51 |
| 6,937,415 B2 * | 8/2005 | Galbraith et al. | 360/53 |
| 6,940,800 B2 * | 9/2005 | Fujimoto et al. | 369/59.22 |
| 7,110,199 B2 * | 9/2006 | Sugawara et al. | 360/48 |
| 7,136,244 B1 * | 11/2006 | Rothberg | 360/53 |
| 7,203,017 B1 * | 4/2007 | Sutardja et al. | 360/51 |
| 7,215,631 B2 * | 5/2007 | Horibe et al. | 369/124.1 |
| 7,511,910 B1 * | 3/2009 | Han | 360/65 |
| 7,522,365 B1 * | 4/2009 | Chen | 360/53 |
| 7,548,579 B1 * | 6/2009 | Murphy et al. | 375/147 |
| 7,612,592 B2 * | 11/2009 | Parikh | 327/175 |
| 7,773,325 B2 * | 8/2010 | Sutardja et al. | 360/51 |
| 8,161,361 B1 * | 4/2012 | Song et al. | 714/795 |
| 2003/0137765 A1 * | 7/2003 | Yamazaki et al. | 360/39 |
| 2003/0147168 A1 * | 8/2003 | Galbraith et al. | 360/53 |
| 2004/0037373 A1 * | 2/2004 | Ashley et al. | 375/341 |
| 2006/0256464 A1 * | 11/2006 | Ozdemir | 360/46 |
| 2008/0043356 A1 * | 2/2008 | Jin et al. | 360/39 |

* cited by examiner

*Primary Examiner* — Dismery Mercedes
(74) *Attorney, Agent, or Firm* — Cesari & Reed, LLP; David K Lucente

(57) ABSTRACT

A hard disk drive with a read channel that averages data before the data is provided to a viterbi detector of the channel. Averaging the data reduces the zero mean noise in the data.

3 Claims, 4 Drawing Sheets

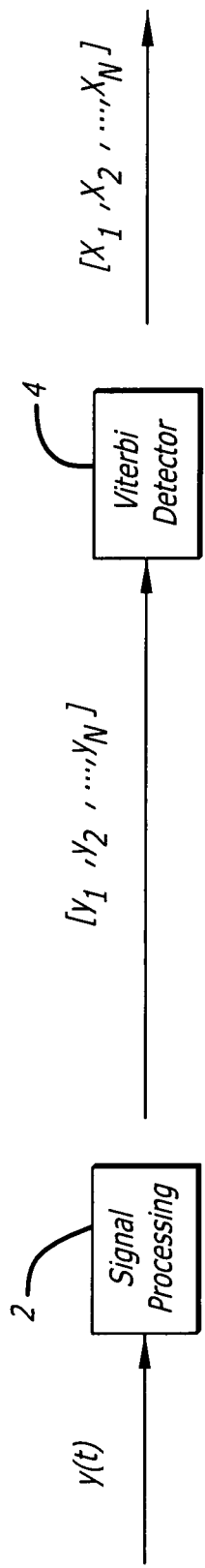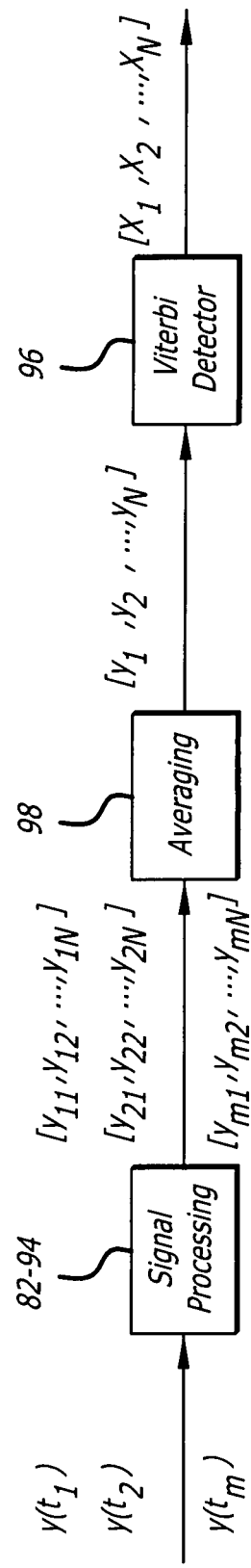

1

READ CHANNEL AVERAGING

BACKGROUND OF THE INVENTION

1. Field of the Invention

The present invention relates to a method for reducing noise in a read channel of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided up into a number of segments or sectors. The voice coil motor and actuator arm can move the heads to different tracks of the disks.

The data written onto the disks has a waveform with numerous transitions. When reading, the waveform is equalized into a partial-response target. The equalized samples are fed into a Viterbi detector to decode the waveform into digital bit strings. Most disk drives contain an error correction code algorithm that detect and compensate for any errors in the data.

FIG. 1 is a schematic showing a conventional partial response maximum likelihood ("PRML") channel that is used to process data read from a disk. The PRML channel can be categorized into two basic blocks, a signal processing block 2, and a Viterbi detector 4. The signal processing block receives a continuous analog signal y(t) and creates an equalized digitized version of the signal depicted as $y_1, y_2, \ldots y_N$. The Viterbi detector provides a maximum likelihood detection to produce digital samples $x_1, x_2, \ldots x_N$. The digital bits $y_1, y_2, \ldots y_N$ can be corrupted by channel noise that may generate detection errors to the Viterbi detector. Normally, the mean of channel noise is zero or close to zero. It would be desirable to utilize this property to reduce noise by performing averages on the samples.

BRIEF SUMMARY OF THE INVENTION

A hard disk drive with a read channel that processes data. The read channel includes an averaging circuit that provides an average of data to a detector.

BRIEF DESCRIPTION OF THE DRAWINGS

FIG. 1 is a schematic of a read channel of the prior art;

FIG. 5 is a schematic of the read channel showing the averaging of data.

DETAILED DESCRIPTION

Disclosed is a hard disk drive with a read channel that averages data before the data is provided to a Viterbi detector of the channel. Averaging the data reduces the zero mean noise in the data.

Figure 2:
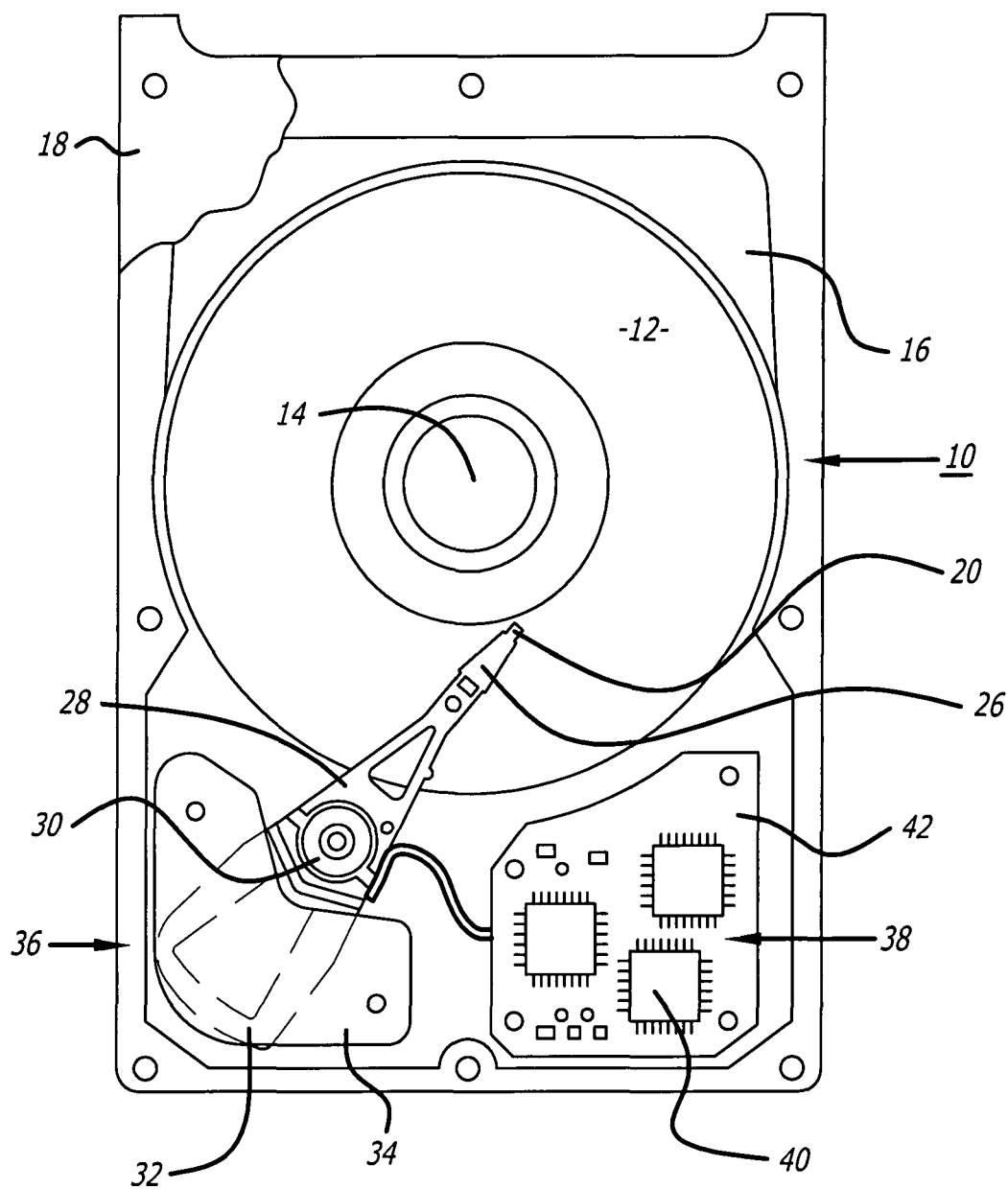
FIG. 2 is a top view of an embodiment of a hard-disk drive.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
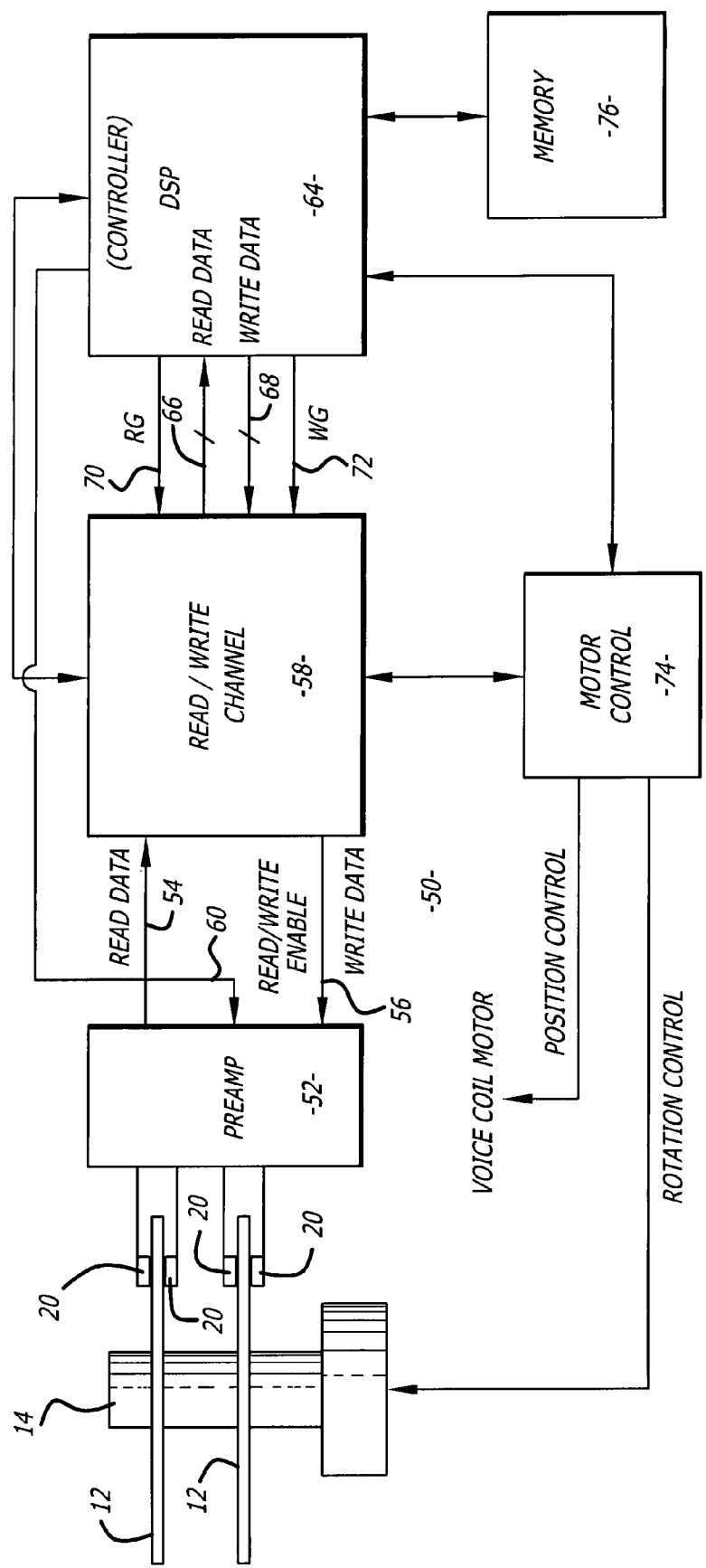
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read-only memory ("ROM").

Figure 4:
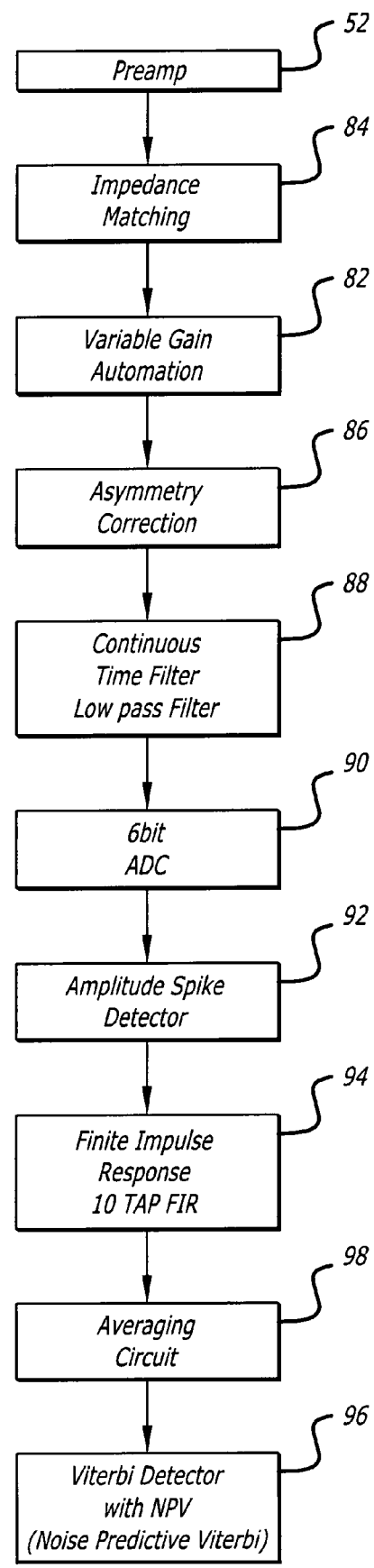
FIG. 4 is a schematic of a read channel of the electrical circuit.

FIG. 4 is a block diagram showing the different functional circuits for a read channel that process data read from a disk. The functional circuits include an automatic gain control (AGC) circuit 82 coupled to the pre-amplifier 52 by a impedance matching circuit 84. The AGC circuit 82 provides automatic gain control of the waveform read from the disk.

The functional circuits may further contain an asymmetry correction circuit 86, a continuous time low-pass filter 88, and an analog-to-digital converter 90 that condition, filter and convert the waveform to a digital bit string. An amplitude spike detector 92 determines the existence of amplitude spikes in the signal. The bit string is provided to a finite impulse response (FIR) circuit 94 that provides finite impulse responses. The data is further provided to a Viterbi detector 96, preferably a noise predictive Viterbi. Although a Viterbi detector is shown and described, it is to be understood that other types of detectors may be employed.

The read channel also contains an averaging circuit 98. The averaging circuit provides the Viterbi detector with an average of the data provided by the FIR 94. Averaging the data reduces zero mean noise in the data. The data to be averaged can be obtained by reading a data sector multiple times. Multiple data can be obtained by reading the same sector multiple times, read retries, or with a head that has multiple read elements. The averaging circuit 98 can be directly coupled to the Viterbi detector 96 in an open-ended arrangement. The averaging circuit 98 can be directly coupled to the Viterbi detector 96 and not have any other modules or circuitry between the averaging circuit 98 and the Viterbi detector 96. The averaging circuit 98 and the Viterbi detector 96 can be arranged in an open-ended arrangement, where there are no feedback loops that feed into the averaging circuit 98, the Viterbi detector 96, or a combination thereof.

FIG. 5 is a schematic showing the same data being read at times $y(t_1), y(t_2), \ldots y(m)$. The data is digitized into $y_{11}, y_{12}$, etc. The averaging circuit 98 then takes an average of $[y_{11}, y_{12}, \ldots y_N]$ to $[y_{M1}, y_{M2}, \ldots y_{MN}]$ and provides the average $[y_1, y_2, \ldots y_N]$ to the Viterbi detector 96. The averaging circuit 98 may contain memory buffers to store the data, and averaging logic to output the average of the data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus, comprising:
a read channel coupled to a head, wherein
said read channel includes a detector,
said read channel includes an averaging circuit having a buffer and averaging logic,
said read channel includes a finite impulse filter directly coupled to said averaging circuit,
said buffer is operable to store read data, wherein said read data comprises a same data being read using said head multiple times at different times,
said averaging logic is operable to average said read data,
said averaging circuit is directly coupled to said detector in an open-ended arrangement operable to provide an average of said data to said detector, and
said detector provides a maximum likelihood detection of said averaged data;
an actuator arm coupled to said head; and
a controller coupled to said read channel.

2. The apparatus of claim 1, wherein said averaging circuit reduces a zero mean noise of said data.

3. The apparatus of claim 1, wherein said averaging circuit produces an average of data read from a disk sector at different times.

* * * * *